(12) United States Patent
Petrescu-Prahova et al.

(10) Patent No.: US 8,862,743 B1
(45) Date of Patent: Oct. 14, 2014

(54) RESOURCE MANAGEMENT

(75) Inventors: Cristian Petrescu-Prahova, Seattle, WA (US); Joseph S. Beda, III, Seattle, WA (US); Vishesh Khemani, Seattle, WA (US); Robert A. Horn, Seattle, WA (US)

(73) Assignee: Google Inc., Mountain View, CA (US)

( * ) Notice: Subject to any disclaimer, the term of this patent is extended or adjusted under 35 U.S.C. 154(b) by 102 days.

(21) Appl. No.: 13/349,547

(22) Filed: Jan. 12, 2012

Related U.S. Application Data

(60) Provisional application No. 61/432,563, filed on Jan. 13, 2011.

(51) Int. Cl.
G06F 15/16 (2006.01)
G06F 15/173 (2006.01)

(52) U.S. Cl.
USPC .......................................... 709/226; 709/219

(58) Field of Classification Search
USPC .................... 709/223–226, 217–219
See application file for complete search history.

(56) References Cited

U.S. PATENT DOCUMENTS

| | | | |
|---|---|---|---|
| 5,463,768 A | 10/1995 | Cudihy et al. | |
| 5,794,224 A * | 8/1998 | Yufik | 706/14 |
| 6,598,179 B1 | 7/2003 | Chirashnya et al. | |
| 7,117,243 B2 | 10/2006 | Peart | |
| 7,761,573 B2 | 7/2010 | Travostino et al. | |
| 7,804,862 B1 | 9/2010 | Olson et al. | |
| 2002/0097747 A1* | 7/2002 | Kirkby et al. | 370/468 |
| 2004/0139368 A1 | 7/2004 | Austen et al. | |
| 2005/0196030 A1* | 9/2005 | Schofield et al. | 382/132 |
| 2005/0237543 A1* | 10/2005 | Kikuchi | 358/1.1 |
| 2005/0289499 A1* | 12/2005 | Ogawa et al. | 716/18 |
| 2006/0048077 A1* | 3/2006 | Boyles et al. | 715/853 |
| 2006/0067236 A1* | 3/2006 | Gupta | 370/238 |
| 2006/0153099 A1* | 7/2006 | Feldman et al. | 370/254 |
| 2007/0199058 A1 | 8/2007 | Baumgart et al. | |
| 2007/0271604 A1 | 11/2007 | Webster et al. | |
| 2007/0280243 A1 | 12/2007 | Wray et al. | |
| 2008/0086515 A1 | 4/2008 | Bai et al. | |
| 2008/0095176 A1* | 4/2008 | Ong et al. | 370/400 |
| 2008/0205415 A1 | 8/2008 | Morales | |
| 2008/0304516 A1* | 12/2008 | Feng et al. | 370/468 |
| 2008/0307258 A1* | 12/2008 | Challenger et al. | 714/20 |
| 2009/0097657 A1 | 4/2009 | Scheidt et al. | |

(Continued)

OTHER PUBLICATIONS

Moller, Jan, et al., "Internal Network Security", Feb. 1, 2000-May 18, 2001, Retrieved from the Internet: <URL: http://www.daimi.au.dk/~fwiffo/thesis/>, 183 pages.

(Continued)

*Primary Examiner* — Ebrahim Golabbakhsh
(74) *Attorney, Agent, or Firm* — Fish & Richardson P.C.

(57) ABSTRACT

Methods, systems, and apparatus, including computer programs encoded on a computer storage medium, for managing resources in a computing system. A plurality of distributed computing system resources are represented as nodes in a graph. Links between the nodes are defined, where each link in the links representing ownership or usage by a parent node of a respective resource represented by a child node. A message is sent from a source node in the graph to a target node in the graph wherein the source node is linked directly or indirectly to the target node. The message is processed by a message handler task associated with the target node, wherein processing includes allocating or deallocating a respective resource represented by the target node.

27 Claims, 7 Drawing Sheets

(56) References Cited

U.S. PATENT DOCUMENTS

| | | | |
|---|---|---|---|
| 2009/0222815 A1 | 9/2009 | Dake | |
| 2009/0249440 A1 | 10/2009 | Platt et al. | |
| 2009/0310554 A1* | 12/2009 | Sun et al. | 370/329 |
| 2010/0046426 A1* | 2/2010 | Shenoy et al. | 370/328 |
| 2010/0071035 A1 | 3/2010 | Budko et al. | |
| 2010/0094819 A1* | 4/2010 | Bornhoevd et al. | 707/705 |
| 2010/0199089 A1 | 8/2010 | Vysogorets et al. | |
| 2010/0325634 A1* | 12/2010 | Ichikawa et al. | 718/103 |
| 2011/0022812 A1 | 1/2011 | van der Linden et al. | |
| 2011/0153838 A1 | 6/2011 | Belkine et al. | |
| 2012/0131180 A1* | 5/2012 | Nomura et al. | 709/224 |
| 2013/0007273 A1* | 1/2013 | Baumback et al. | 709/224 |
| 2013/0019243 A1* | 1/2013 | Schmidt et al. | 718/1 |

OTHER PUBLICATIONS

Primet, Pascale, et al . . . , "HIPCAL: State of the Art of OS and Network virtualization solutions for Grids", Sep. 14, 2007, 38 pages.

Farinacci et al., "RFC 2784: Generic Routing Encapsulation (GRE)", Mar. 2000, The Internet Society, 10 pages.

Kent et al., "RFC 4301: Security Architecture for the Internet Protocol", Dec. 2005, The Internet Society, 102 pages.

Myerson, Judith. "Creating Applications with Amazon EC2 and S3." O'ReillyOnLamp.com, May 13, 2008 [Retrieved on Apr. 26, 2011]. Retrieved from the Internet <URL: http://onlamp.com/pub/a/onlamp/2008/05/13/creating-applications-with-amazon-ec2-and-s3.html>, 8 pages.

Microsoft Support. "How to view and manage event logs in Event Viewer in Windows XP." May 7, 2007, version 3.5 [Retrieved on Feb. 15, 2011]. Retrieved from the Internet <URL: http://support.microsoft.com/kb/308427>, 6 pages.

Travostino, Franco, et al., Seamless Live Migration of Virtual Machines over the MAN/WAN, 2006, Elsevier Future Generation Computer Systems 2006, 10 pages.

Chen, Per M., et al., : "Maximizing Performance in a Striped Disk Array", 17th Annual International Symposium on Computer Architecture (SIGARCH 1990), 18 pages.

Sarhan, Nabil J., et al., "Caching and Scheduling in NAD-Based Multimedia Servers"; IEEE Computer Society, IEEE Transactions on Parallel and Distributed Systems, vol. 15, No. 10, Oct. 2004; pp. 921-933.

Vazhkudai, Sudharshan S., et al.; "Constructing Collaborative Desktop Storage Caches for Large Scientific Datasets"; ACM Journal Name, vol. V, No. N, Jun. 2006, 34 pages.

\* cited by examiner

RESOURCE MANAGEMENT

CROSS-REFERENCE TO RELATED APPLICATIONS

This application claims the benefit under 35 U.S.C. §119 (e) of U.S. Provisional Application Ser. No. 61/432,563, filed on Jan. 13, 2011 entitled "RESOURCE MANAGEMENT," the entirety of which is hereby incorporated by reference.

BACKGROUND

This specification relates to managing system resources.

Cloud computing is network-based computing in which typically large collections of servers housed in data centers or "server farms" provide computational resources and data storage as needed to remote end users. Some cloud computing services provide access to software applications such as word processors and other commonly used applications to end users who interface with the applications through web browsers or other client-side software. Users' electronic data files are usually stored in the server farm rather than on the users' computing devices. Maintaining software applications and user data on a server farm simplifies management of end user computing devices. Some cloud computing services allow end users to execute software applications in virtual machines.

SUMMARY

This specification describes technologies relating to managing resources in a computing system.

In general, one innovative aspect of the subject matter described in this specification can be embodied in methods that include the actions of representing a plurality of distributed computing system resources as nodes in a graph, the distributed system resources including a plurality of hardware virtualizations implemented on different host machines; defining links between the nodes, each link in the links representing ownership or usage by a parent node of a respective resource represented by a child node; sending a message from a source node in the graph to a target node in the graph wherein the source node is linked directly or indirectly to the target node; and processing the message by a message handler task associated with the target node, wherein processing includes allocating or deallocating a respective resource represented by the target node. Other embodiments of this aspect include corresponding systems, apparatus, and computer programs, configured to perform the actions of the methods, encoded on computer storage devices.

These and other embodiments can each optionally include one or more of the following features. The message handler task for the persisted message is scheduled. Sending the message includes storing the message in a persistent storage device. Processing the message by a message handler task includes accessing the message in persistent storage. The persistent storage is replicated in multiple persistent storage devices. Messages to a host machine of a virtual computing system are processed. Processing messages to a host machine includes using a remote procedure call. The graph is a directed graph. The actions further include receiving an indication of a failed resource; identifying a new resource of the same type as the failed resource; and migrating allocation from the failed resource to the new resource. A node in the graph corresponding to the failed resource is deleted. One or more child nodes descendant from the failed resource node are deleted.

Particular embodiments of the subject matter described in this specification can be implemented so as to realize one or more of the following advantages. A resource manager that models system resources in a directed graph with persistent message passing enables a virtual machine system to respond to and recover from unexpected events and resource failures. The resource manager improves fault tolerance of the virtual machine system so that long-running operations can withstand resource failures and can continue even through hardware upgrades. Message passing allows the virtual machine system to be distributed geographically so that operations can continue after failure of entire datacenters. Transactional changes to individual resources in the graph improve scalability of the resource manager. A message handling layer above the directed graph improves flexibility by allowing new message and resource types to be defined without altering the graph or message-passing architecture.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
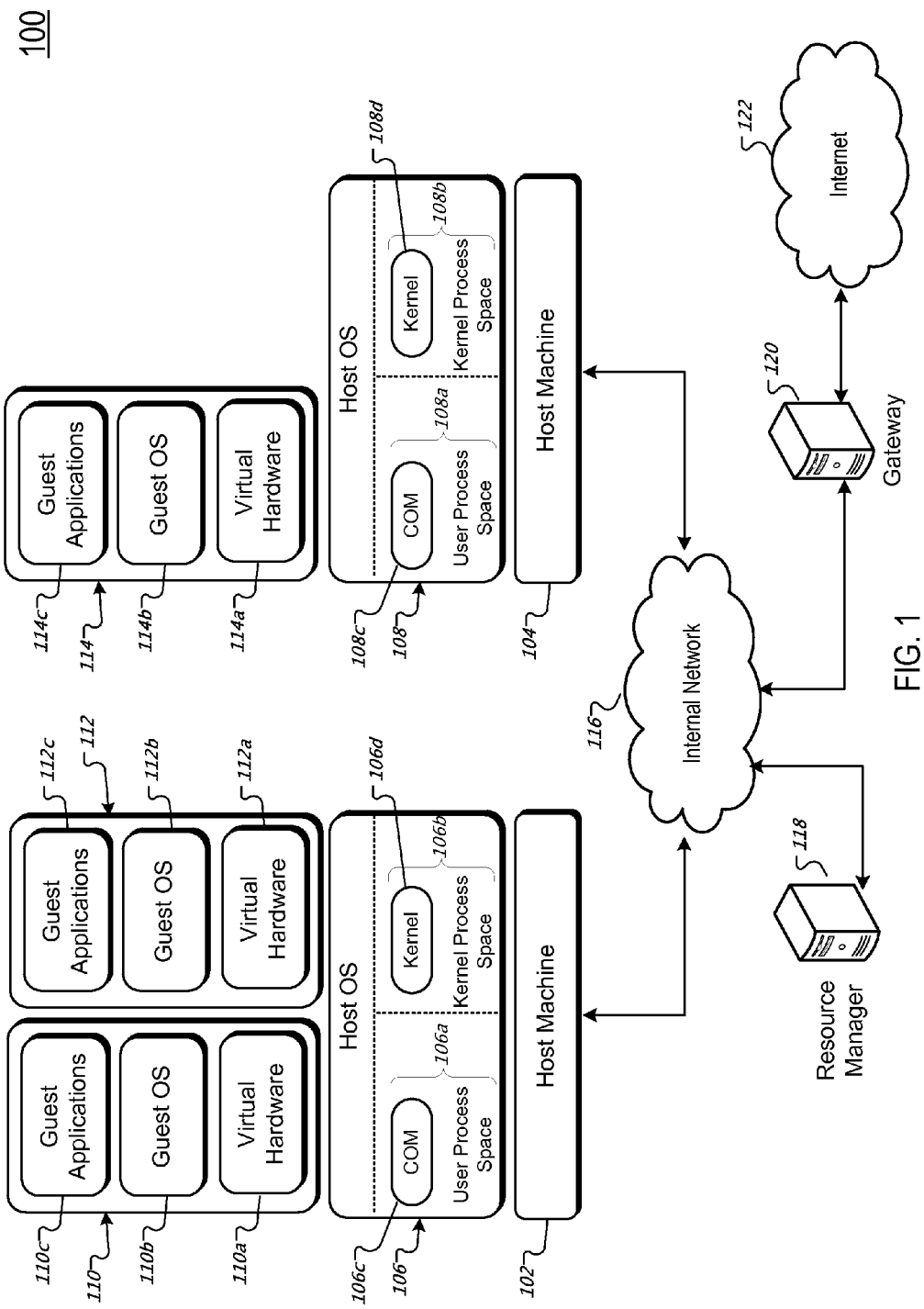
FIG. 1 is a schematic illustration of an example virtual machine system.

FIG. 1 is a schematic illustration of an example virtual machine system 100. The system 100 includes one or more host machines such as, for example, host machine 102 and host machine 104. Generally speaking, a host machine is one or more data processing apparatus such as a rack mounted servers or other computing devices. The data processing apparatus can be in different physical locations and can have different capabilities and computer architectures. Host machines can communicate with each other through an internal data communications network 116. The internal network can include one or more wired (e.g., Ethernet) or wireless (e.g., WI-FI) networks, for example. In some implementations the internal network 116 is an intranet. Host machines can also communicate with devices on external networks, such as the Internet 122, through one or more gateways 120 which are data processing apparatus responsible for routing data communication traffic between the internal network 116 and the external network 122. Other types of external networks are possible.

Each host machine executes a host operating system or other software that virtualizes the underlying host machine hardware and manages concurrent execution of one or more virtual machines. For example, the host operating system 106 is managing virtual machine (VM) 110 and VM 112, while host OS 108 is managing a single VM 114. Each VM includes a simulated version of the underlying host machine hardware, or a different computer architecture. The simulated version of the hardware is referred to as virtual hardware (e.g., virtual hardware 110a, 112a and 114a). Software that is executed by the virtual hardware is referred to as guest software. In some implementations, guest software cannot determine if it is being executed by virtual hardware or by a physical host machine. If guest software executing in a VM, or the VM itself, malfunctions or aborts, other VMs executing on the host machine will not be affected. A host machine's microprocessor(s) can include processor-level mechanisms to enable virtual hardware to execute software applications efficiently by allowing guest software instructions to be executed directly on the host machine's microprocessor without requiring code-rewriting, recompilation, or instruction emulation.

Each VM (e.g., VMs 110, 112 and 114) is allocated a set of virtual memory pages from the virtual memory of the underlying host operating system and is allocated virtual disk blocks from one or more virtual disk drives for use by the guest software executing on the VM. For example, host operating 106 allocates memory pages and disk blocks to VM 110 and VM 112, and host operating system 108 does the same for VM 114. In some implementations, a given VM cannot access the virtual memory pages assigned to other VMs. For example, VM 110 cannot access memory pages that have been assigned to VM 112. A virtual disk drive can be persisted across VM restarts. Virtual disk blocks are allocated on physical disk drives coupled to host machines or available over the internal network 116, for example. In addition to virtual memory and disk resources, VMs can be allocated network addresses through which their respective guest software can communicate with other processes reachable through the internal network 116 or the Internet 122. For example, guest software executing on VM 110 can communicate with guest software executing on VM 112 or VM 114. In some implementations, each VM is allocated one or more unique Internet Protocol (IP) version 4 or version 6 addresses and one or more User Datagram Protocol (UDP) port numbers. Other address schemes are possible. The VM IP addresses are visible on the internal network 116 and, in some implementations, are visible on the Internet 122 if the addresses are advertised using a suitable routing protocol, for instance.

A VM's guest software can include a guest operating system (e.g., guest operating systems 110b, 112b and 114b) which is software that controls the execution of respective guest software applications (e.g., guest applications 110c, 112c and 114c), within the VM and provides services to those applications. For example, a guest operating system could be a variation of the UNIX operating system. Other operating systems are possible. Each VM can execute the same guest operating system or different guest operating systems. In further implementations, a VM does not require a guest operating system in order to execute guest software applications. A guest operating system's access to resources such as networks and virtual disk storage is controlled by the underlying host operating system.

By way of illustration, and with reference to virtual machine 110, when the guest application 110c or guest operating system 110b attempts to perform an input/output operation on a virtual disk, initiate network communication, or perform a privileged operation, for example, the virtual hardware 110a is interrupted so that the host operating system 106 can perform the action on behalf of the virtual machine 110.

The host operating system 106 can perform these actions with a process that executes in kernel process space 106b, user process space 106a, or both.

The kernel process space 106b is virtual memory reserved for the host operating system 106's kernel 106d which can include kernel extensions and device drivers, for instance. The kernel process space has elevated privileges (sometimes referred to as "supervisor mode"); that is, the kernel 106d can perform certain privileged operations that are off limits to processes running in the user process space 106a. Examples of privileged operations include access to different address spaces, access to special functional processor units in the host machine such as memory management units, and so on. The user process space 106a is a separate portion of virtual memory reserved for user mode processes. User mode processes cannot perform privileged operations directly.

In various implementations, a portion of VM network communication functionality is implemented in a communication process (e.g., communication process 106c). In some implementations, the communication process executes in the user process space (e.g., user process space 106a) of a host operating system (e.g., host operating system 106). In other implementations, the communication process can execute in the kernel process space (e.g., kernel process space 106d) of the host operating system. There can be a single communication process for all VMs executing on a host machine or multiple communication processes, one for each VM executing on a host machine. In yet further implementations, some portion of the communication process executes in the user process space and another portion executes in the kernel process space. The communication process communicates with a resource manager (e.g. resource manager 118) in order to effectuate and respond to changes in the system 100. The resource manager 118 is one or more data processing apparatus that execute software for keeping track of allocated and unallocated system resources. The data processing apparatus can be in different locations and can have different capabilities and computer architectures.

Figure 2:
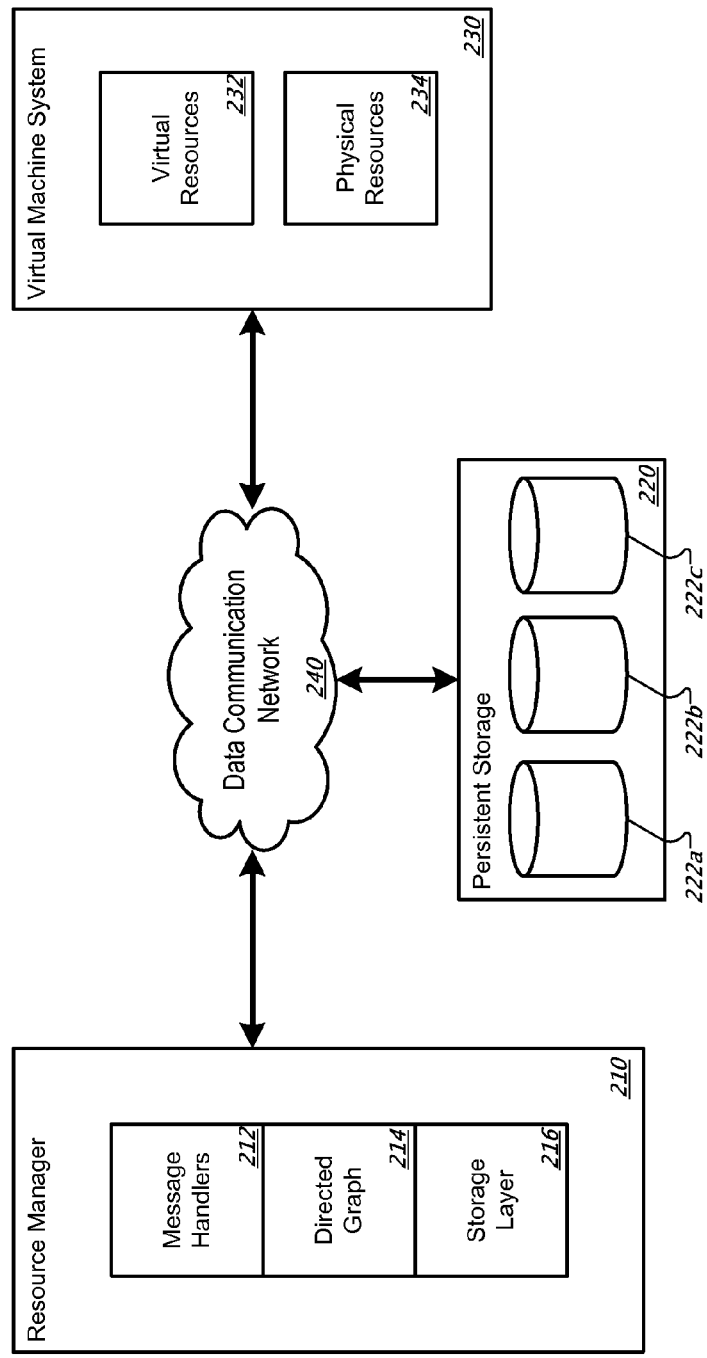
FIG. 2 is a schematic diagram of an example resource manager.

FIG. 2 is a schematic diagram of an example resource manager 210. The resource manager 210 models the allocation and deallocation of resources in the virtual machine system 230. Allocating a resource for the virtual machine system 230 can reserve the resource for a so-called owner that controls the lifecycle of that resource. Ownership need not define an exclusive use relationship. Allocating a resource for the system 230 can also permit a user to use the resource—a usage allocation. Owners and users can be human operators, computer processes, or any other resource in the system 230. Some resources can have a maximum number of owners and users. In some implementations, each resource has exactly one owner.

The resource manager 210 can allocate a variety of types of resources in the virtual machine system 230, including physical resources 234, virtual resources 232, and other resources. Types of resources that can be allocated by the resource manager 210 include, for example, a physical host machine, a physical hard disk, a network connection, network firewall rules, a virtual machine, a logical virtual machine, and a virtual disk. These resources can be allocated to a human owner, to a virtual machine, or to a host machine in the system 230.

The resource manager 210 enables a virtual machine system 230 to react to and recover from resource failures. If a resource in the virtual machine system 230 fails, the resource manager 210 can allocate other resources for the system 230 to account for the failure and migrate resource ownership or usage from the failed resource to other available resources.

Because a system resource manager 210 enables a system 230 to recover from resource failures, the resource manager 210 can be made robust in various ways.

The resource manager 210 generally operates by routing messages to and from various entities in the system 230. The messages can be sent to entities in the system 230 through an internal data communication network 240, for example, or through other inter-process communication means. The data communication network 240 can be the same network as internal network 116 of FIG. 1, but need not be. Messages can be queued in persistent storage 220 before being handled by a recipient. The persistent storage 220 can persist messages in one or more storage devices so that processing of the messages can resume after a system failure. In other words, the messages can remain in storage after the processes that stored them have ended or failed. The persistent storage 220 can also persist other aspects of the resource manager 210 needed to restore the state of the resource manager to a state before a system failure. The persistent storage 220 can be replicated across multiple hard disks or other computer-readable media, e.g., disks 222a, 222b, and 222c.

An architecture of the resource manager 210 can include logical software components or layers. An uppermost layer is a message handler layer 212. The message handler layer 212 includes definitions of message types and message handler routines. The message handler routines receive messages and respond in various ways that can affect the allocation or deallocation of system 230 resources. Message handler routines can also send messages to other entities in the system 230. In some implementations, the message handler layer is implemented in a continuation-passing style in which message handlers are identified explicitly in the message itself. In other words, every message can include an identification of the message handler.

In some implementations, function or procedure calls between layers can be implemented as remote procedure calls. Remote procedure calls allow a software process executing on one data processing apparatus to invoke a software process that is executing on a different data processing apparatus. Using remote procedure calls can allow layers of the resource manager to be implemented on multiple data processing apparatus.

The layer logically below the message handler layer 210 is a directed graph layer 214. The directed graph layer 214 maintains a directed graph of the underlying ownership and usage structure of resources in the system 230. Each node in the graph corresponds to a resource in the system 230, and in some implementations each node has an associated message handler. A node can correspond to a resource (e.g., a hard disk or a virtual machine). Each link in the graph corresponds to an ownership or usage allocation of a resource. The directed graph layer 214 maintains the graph by adding and deleting nodes and links in the graph. For example, if a host machine (e.g., host machine 102) fails, all resources owned or used by that host machine can be deallocated by deleting the appropriate nodes and links in the graph. In some implementations, if a parent node is deleted, all child nodes and corresponding links are also deleted.

The directed graph layer 214 can use links in the graph to route messages to the appropriate message handlers. For example, a parent node can send a message to a child node. In other words, the parent node's message handler sends a message indicating that the child node's message handler should handle the message. In response, the child node can handle the message through its associated message handler or send a message back to the parent node by indicating that the parent node's message handler should handle the message.

In general, messages can contain any type of data. Some messages can have specific types, which can be handled according to the context of the recipient. For example, a parent node can also send a "Create" message to a nonexistent child node. The message handler for the nonexistent child node can handle a "Create" message by creating an instance of a node. The parent node's message handler sends the "Create" message, indicating that the message should be handled by a new child node after it is created. The directed graph layer creates a new child node, associates a message handler definition with the new child node, and passes the message to the new child node. The new child node's message handler processes the message. The new child node's message handler can, for example, respond to the parent node by sending a "Create link" message back to the parent node, which can result in a link being created in the graph between the parent node and the child node. Links between nodes can be used by the directed graph layer 214 for appropriately routing messages according to links maintained in the directed graph layer 214.

Some message types cause updates to be propagated to multiple nodes at multiple levels of the graph. For example, a message containing an update to firewall rules may be applicable to multiple elements of data communication network 240, e.g., routers, switches, host machines, and virtual machines. If a node corresponding to the data communication network 240 receives a message to update firewall rules in the network, the updated firewall rules can be propagated to all nodes in the graph requiring the update.

Layering the message handler layer 212 logically above the directed graph layer 214 can allow software developers to easily define new message types and new resource types. Defining a new message type or a new resource type can involve writing software code only for new message handlers in the message handler layer 212 without altering the functionality of the directed graph layer 214. The ability to easily define new resource types and new message types can improve flexibility and scalability of the resource manager because the types of messages and resources modeled in the system are not constrained to a predefined set of resource types.

Messages are sent to entities in the system by the storage layer 216. The storage layer 216 stores all messages in persistent storage 220. Storing messages in the persistent storage 220 can ensure that the resource manager 210 can recover and resume its current state after system failures. In some implementations, the storage layer 216 also stores nodes and links of the directed graph in persistent storage 220 upon creation. When the resource manager 210 resumes after a partial or complete system failure, nodes and links of the directed graph can be retrieved from the persistent storage 220 to rebuild the graph. Storing messages in the persistent storage 220 can allow message processing to resume at the previous system state before the system failure occurred.

The storage layer 216 can implement and maintain multiple message queues. A separate queue can be created between each pair of communicating nodes in the graph, for instance. Creating multiple queues can improve system throughput and scalability. The particular order of messages in a queue can also be stored in the persistent storage 220, as well as messages in the queue. In some implementations, messages in queues are causally ordered, such that messages sent first are first in the queue. The resource manager can determine which of two messages were sent first by comparing a timestamp included in the message. Other ways of ordering messages in queues are possible.

To send a message, a node in the graph can call the storage layer 216 with the message and an identification of the recipient node. The storage layer 216 can store the message in a queue associated with the recipient node. The storage layer 216 can also enqueue a task in memory of a data processing apparatus to trigger the recipient node's message handler to read and process the message. Upon being triggered, the recipient node's message handler can call the storage layer to read the next message from the queue. The storage layer 216 reads the next message from the appropriate queue and returns the message to the recipient node's message handler for processing.

In some implementations, message handlers can be implemented as transactions. Transactions ensure that either all message handler operations succeed or that no message handler operations succeed. In some implementations, the transactions ensure the "ACID" guarantees of atomicity, consistency, isolation, and durability.

In general, each message handler can make changes to the directed graph layer 214 and send one or more messages to other entities in the system. Examples of operations that message handlers can perform include changing the state of a node, creating or deleting links to other nodes, affecting changes in systems outside of the resource manager 210 (e.g., changes in the virtual machine system 230), sending new messages to itself or to other nodes, and creating or deleting nodes. If requested changes to the directed graph layer 214 are unsuccessful, the message handler can send an error message instead of sending messages associated with a successful change. For example, if the resource manager tries to allocate an IP address for a virtual machine and succeeds, a success message can be sent. But if the allocation of the IP address fails, an error message can be sent. In the case of critical failures (from, e.g., conflicting messages sent from multiple processes), the resource manager can restore the system by deleting nodes for the failed resources and inserting new nodes into the graph. The transactional implementation of message handlers can ensure that a system failure that occurs before completion of a message handler process will not result in incomplete or partial changes to the directed graph layer 214. In some implementations, message handlers are stateless; in other words, the actions of a message handler do not depend on the current state of the directed graph layer 214. The transactional implementation of message handlers can improve scalability of the system by implementing transactions on one resource at a time. Implementing transactions on one resource at a time can ensure that multi-message operations serialize at exactly one resource instead of multiple resources. In other words, all resources involved in a multi-message operation need not wait for all messages in the operation to be processed.

As a result of certain failures or errors in the system, some messages may remain unprocessed in the persistent storage 220. The resource manager 210 can determine that an atypical amount of time has passed from the time the message was enqueued and determine that the message is an unprocessed message. In order to handle unprocessed messages, the storage layer 216 can implement a scanner process. The scanner process can be a separate process executing on data processing apparatus that periodically checks the messages queues for unprocessed messages and handles them by invoking the appropriate message handler.

The resource manager 210 can be implemented in multiple instances of processes executing on data processing apparatus, and the multiple process instances can be executing on multiple data processing apparatus. Additionally, each process instance can include multiple lightweight processes (e.g., threads), each lightweight process being triggered to execute software code for message handlers of nodes in the system in response to messages in the persistent storage 220. The ability to implement the resource manager 210 in an arbitrarily large number of data processing apparatus executing message handlers can improve scalability of the resource manager 210. The resource manager 210 can thus manage an arbitrarily large number of resources in the virtual machine system 230.

In the event that two competing processes send conflicting messages to the same node, the resource manager 210 can use the message queues to enforce causal ordering. In other words, a message that was sent first will prevail. The conflicting message that was sent second will fail, which can result in an error message being sent back to the sender.

In some implementations, the resource manager 210 can improve throughput of the message processing by implementing an optimistic master writing process to handle writing messages to the persistent storage 230. The master writing process can be a computer program executing on one or more data processing apparatus of the resource manager 210. An optimistic process is a process that potentially competes with other peer processes for performing the same operation, but an optimistic process does not check for or wait to see if other competing processes might be performing the same operation. Instead, the first optimistic process to successfully complete the task wins the competition. An identified master writing process can receive write requests from other processes (from, e.g., processes of the directed graph layer 214) and write corresponding messages to the persistent storage 230. Other processes that rely on the master writing process will be referred to as "client processes." The master writing process can write messages to the persistent storage 230 in batches and can perform multiple writes in the same operation, which can improve the throughput of message processing. Throughput can be particularly improved in implementations where the persistent storage 230 is replicated across multiple storage devices that require periodic synchronous replication.

The resource manager 210's current master writing process can be identified by an identifier written into the persistent storage 230. In some implementations, the identifier is an RPC address of the current master writing process. Client processes can retrieve from the persistent storage 230 the RPC address of the master writing process and can use this RPC address to forward messages to the master writing process for writing the messages to the persistent storage 230. A master writing process can send an acknowledgement to the client process that requested the message to be written to the persistent storage 230 to indicate a successful write.

When a new master writing process is started, the new master writes its own identifier (e.g., RPC address) into the persistent storage 230. When other competing master writing processes encounter an RPC address of another master writing process in the persistent storage 230, these competing processes will exit. In other words, competing processes that lose the race to write their own RPC address to the persistent storage 230 automatically end themselves so that only one master writing process exists at a time.

If the current master writing process fails or crashes, client processes can start a new master writing process. If, for example, a client process waits for an abnormally long amount of time for the current master writing process to send an acknowledgment, that client process can start a new master writing process. A newly created master writing process can in turn write its own RPC address into the persistent storage 230. Other client processes that have also waited an abnormally long amount of time for an acknowledgement may also create new master writing processes. However, only one new master writing process will succeed in being first to write its RPC address to the persistent storage; the others will encounter the RPC address of the first master writing process and exit. Therefore, client processes are not required to coordinate in order to choose a master writing process. Instead, client processes only need to measure timeouts and create new master writing processes in response.

The resource manager 210 can also send messages that affect resources of the virtual machine system 230. For example, a node in the graph can send a "Start VM" message that starts a virtual machine on a host machine in the virtual machine system 230. "Start VM" is an example of a message type. The message can initially be sent to another node in the graph (e.g., to a virtual machine node), or the message can be sent to the same sender node. Sending the "Start VM" through the storage layer 216 can ensure that the message is persisted in storage such that on a system failure, the "Start VM" message will survive and be processed appropriately. When a recipient node receives the "Start VM" message, the node can communicate with a communication process (e.g., communication process 106c) on a host machine (e.g., host machine 106) to start a virtual machine. In some implementations, the recipient node communicates with the communication process with a remote procedure call. If the remote procedure call fails or never returns, an error message can be sent to the node sending the "Start VM" message. Error messages can be sent through the storage layer 216 to ensure that even after a system failure, the resource manager 210 can resume and handle errors appropriately.

Figure 3:
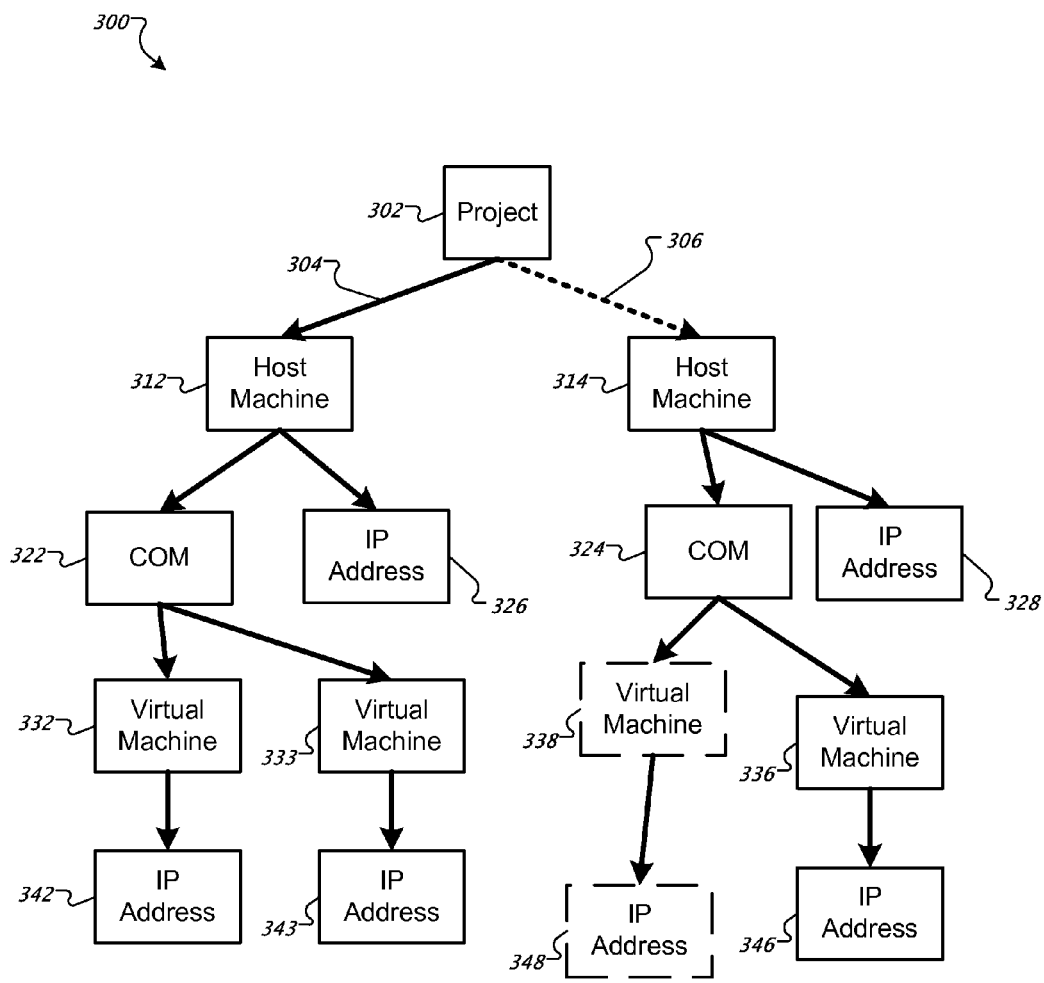
FIG. 3 is a diagram of an example directed graph.

FIG. 3 is a diagram of an example directed graph 300. The directed graph 300 can be implemented, for example, by the directed graph layer 214. Directed graphs can be implemented by the resource manager at a variety of logical levels. Directed graph 300, for example, models both virtual machines (e.g., virtual machine node 332) as well as host machines (e.g., host machine 312) in the virtual computing system. However, a directed graph can also be implemented so as to model only aspects of virtual machines in the virtual computing system, leaving allocation of host machines to scheduling processes running on host machines of the virtual machine system. The top-level node of the directed graph 300 is a project node 302. In some implementations, the project node 302 corresponds to a user account of the virtual machine system 100. Nodes descendant from the project node correspond to resources owned or used by the project node. In other words, nodes descendant from the project node 302 represent resources allocated to a user account of the virtual machine system 100.

The project node 302 is linked to two host machines by links 304 and 306, 312 and 314. Link 304 is an ownership link, representing that the project 302 "owns" the host machine resource corresponding to host machine node 312. Link 306 is a usage link, representing that the project 302 has permissions to use the host machine resource corresponding to host machine node 314. In some implementations, a node can have at most one ownership link, but multiple usage links. Resource owners (e.g., project 302) can be responsible for the lifecycle of a resource allocation such that a resource will not be deallocated until the ownership link is deleted. In other words, deletion of usage links need not result in a resource being deallocated.

Ownership and usage links can be used by the resource manager to garbage collect nodes when deallocating resources in order to recycle the resources. The resource manager can implement a variety of garbage collection policies. In some implementations, if a node is deleted, all links to that node are also deleted. In some implementations, if a parent node is deleted, all of the parent's child nodes are also deleted.

Ownership and usage relationships (identified by links in the graph) can also be used by the resource manager 210 to implement an access control layer. An access control layer identifies actors (e.g., users, processes, host machines, etc.) that have permission to invoke changes to the graph structure. For example, if the project node 302 receives a message to start a virtual machine, but the message is from an unauthorized actor, an error message can be sent to the unauthorized actor, or the message can simply be discarded. In some implementations, each project node (e.g., node 302) implements an access control layer. In some other implementations, each node of the graph implements an access control layer.

Host machine node 312 is linked to a COM node 322 and an IP Address node 326. The COM node 322 can correspond to a communication process (e.g., communication process 108c) running on a host machine (e.g., host machine 108). The COM node 322 is linked to two virtual machines 332 and 333. The virtual machine nodes 332 and 333 are linked to respective IP Address nodes 342 and 343.

Host machine node 314 is linked to a COM node 324 and an IP Address node 328. COM node 324 is linked to a virtual machine node 336, which in turn is linked to an IP Address node 346.

Creating nodes in the graph 300 can be accomplished by passing messages to new nodes. For example, in response to a user request, COM node 324 can send a message to create a new virtual machine node 338, which can send a message to create a corresponding new IP Address node 348. New IP Address node 348 can send a message back to virtual machine node 338 indicating successful creation. The new virtual machine node 338 (or the new IP Address node 348) can also send a message to the virtual machine system to allocate a new IP address for the new virtual machine. After successfully allocating an IP address for a new virtual machine, the virtual machine node 338 can send a message to the communication process running on the host machine (corresponding to COM node 324) to start a new virtual machine on the host machine (corresponding to host machine node 314).

Figure 4:
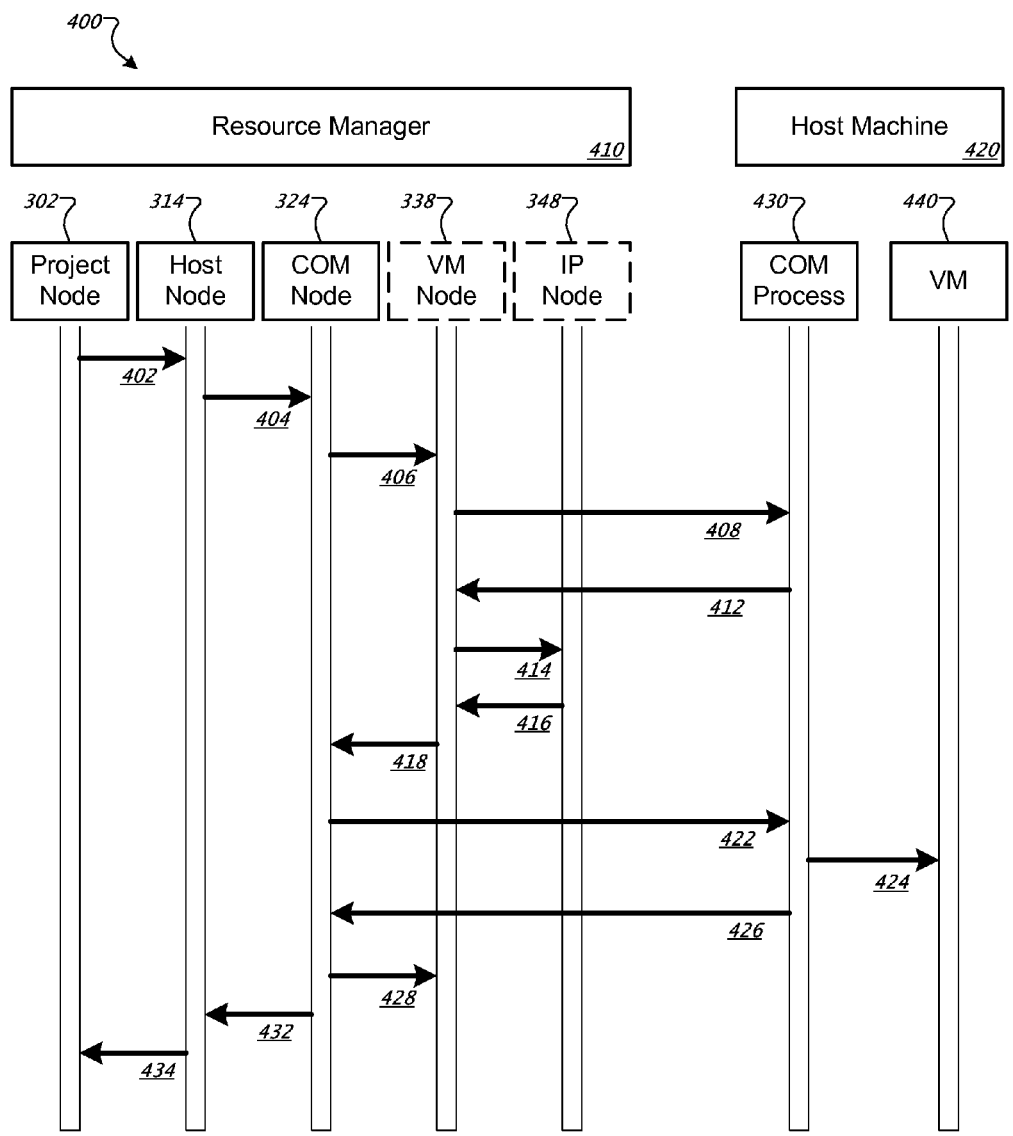
FIG. 4 is a sequence diagram of an example process for starting a new virtual machine.

FIG. 4 is a sequence diagram of an example process 400 for starting a new virtual machine. The example process 400 will be described as being performed to insert a virtual machine 338 on the directed graph 300 as shown in FIG. 3. The example process 400 can be performed in response to a user action to start a new virtual machine. The resource manager 410 can access a project node 302 associated with the user account to identify a host machine 420 on which to start the requested new virtual machine. If no host machines have been allocated to the project node 302, the resource manager can allocate a new host machine (e.g., host machine 420) for the project node 302. Nodes in the directed graph 300 can interact with computer programs executing on a host machine. Actions taken by nodes can be implemented by message handlers as described with respect to FIG. 2, and message routing can be implemented through the storage layer 216 and persistent storage 220 as described with respect to FIG. 2.

The resource manager 410 receives a request to allocate a virtual machine to a project corresponding to project node 302. The resource manager 410 triggers the message handler for project node 302 to handle the request.

Project node 302 sends a "Start VM" message 402 to host machine node 314. The host machine node 314 handles the message and sends a "Start VM" message 404 to COM node 324.

The COM node 324 sends a "Create" message 406 to a new VM node 338. In some implementations, the VM node 338 does not exist when the message is sent, but is created when a VM node message handler is triggered. In some implementations, a generic "Create" message can be sent to a message handler, and the message handler implements the resource-specific operations needed to create that resource node.

A VM node message handler is triggered in response to the "Create" message 406. The VM node message handler creates VM node 338 and creates an associated ownership link to COM node 324.

The VM node message handler allocates a new IP address for the new virtual machine by sending a "Get IP Address" message 408 to the COM process 430 running on host machine 420. In some implementations, the "Get IP Address" message is a remote procedure call. The COM process 430 responds with a new IP address 412.

The VM node message handler sends a "Create" message 414 to create a new IP node 348. The message handler is triggered and creates IP node 348 as well as an associated ownership link to VM Node 338.

The IP Node 348 sends a "Success" message 416 to VM Node 338. The VM Node 338 sends a "Success" message 418 to COM Node 324.

After receiving the "Success" message 418, the COM node 324 sends a message 422 to the COM process 430 to start a new virtual machine. The COM process 430 starts virtual machine 440 and assigns the virtual machine the IP address identified from the previous "Get IP Address" message 408.

The COM process 430 sends a "Success" message 426 to the COM node 324. The COM node 324 sends a message 428 to VM node 338 to communicate that the virtual machine 440 was started successfully. The COM node 324 sends a "Success" message 432 to host node 314, and the host node 314 sends a "Success" message 434 to project node 302.

Figure 5:
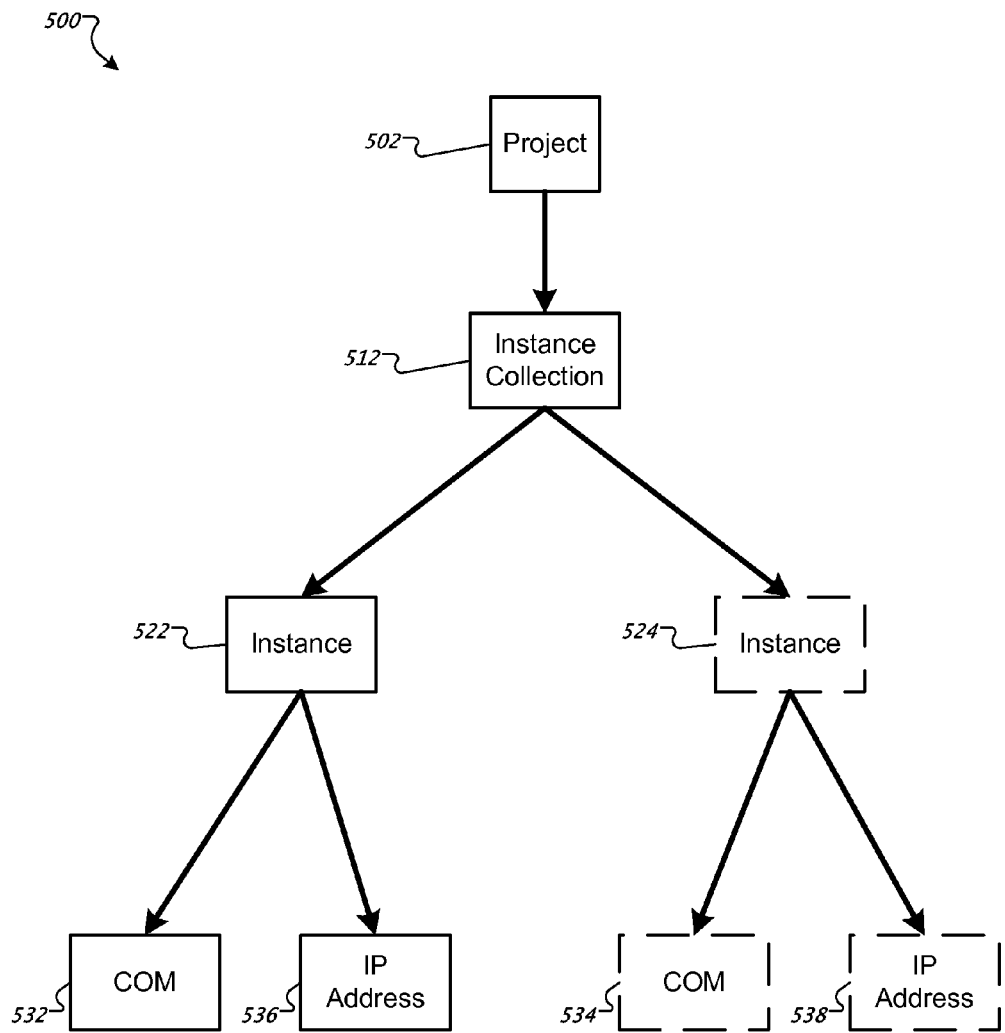
FIG. 5 is a diagram of an example directed graph.

FIG. 5 is a diagram of an example directed graph 500. The directed graph 500 can be implemented, for example, by the directed graph layer 214. Unlike directed graph 300, the directed graph 500 does not contain nodes corresponding to host machines or their IP addresses. Instead, allocation of particular host machines for virtual machines can be handled by a scheduling process executing on data processing apparatus of the virtual machine system.

The top-level node of the directed graph 500 is a project node 502, which can correspond to a user account of the virtual machine system 100. Like directed graph 300, nodes descendant from the project node 502 can represent resources allocated to a user account of the virtual machine system 100.

The project node 502 is linked to an instance collection node 512. An instance collection represents a collection of similarly typed resources. For example, the instance collection can contain a collection of virtual machines allocated to the project node 502.

When a new virtual machine is allocated to the project node (for example, in response to a user request), an instance node can be created and linked to the instance collection 512. Instance collection node 512 is linked to two instances: instance 522, and a new instance 524. In some implementations, an instance corresponds to a virtual machine running on a host machine. In some other implementations, an instance corresponds to a logical virtual machine, which represents a virtual machine implemented over its lifetime by one or more coordinating virtual machine processes. To a user, the logical virtual machine appears to be a single, long-running virtual machine; the multiple coordinating virtual machines are transparent to the user.

Each instance node is linked to an associated COM node, e.g., COM nodes 532 and 534. Each instance is also linked to an associated IP Address node, e.g., IP Address nodes 536 and 538.

Figure 6:
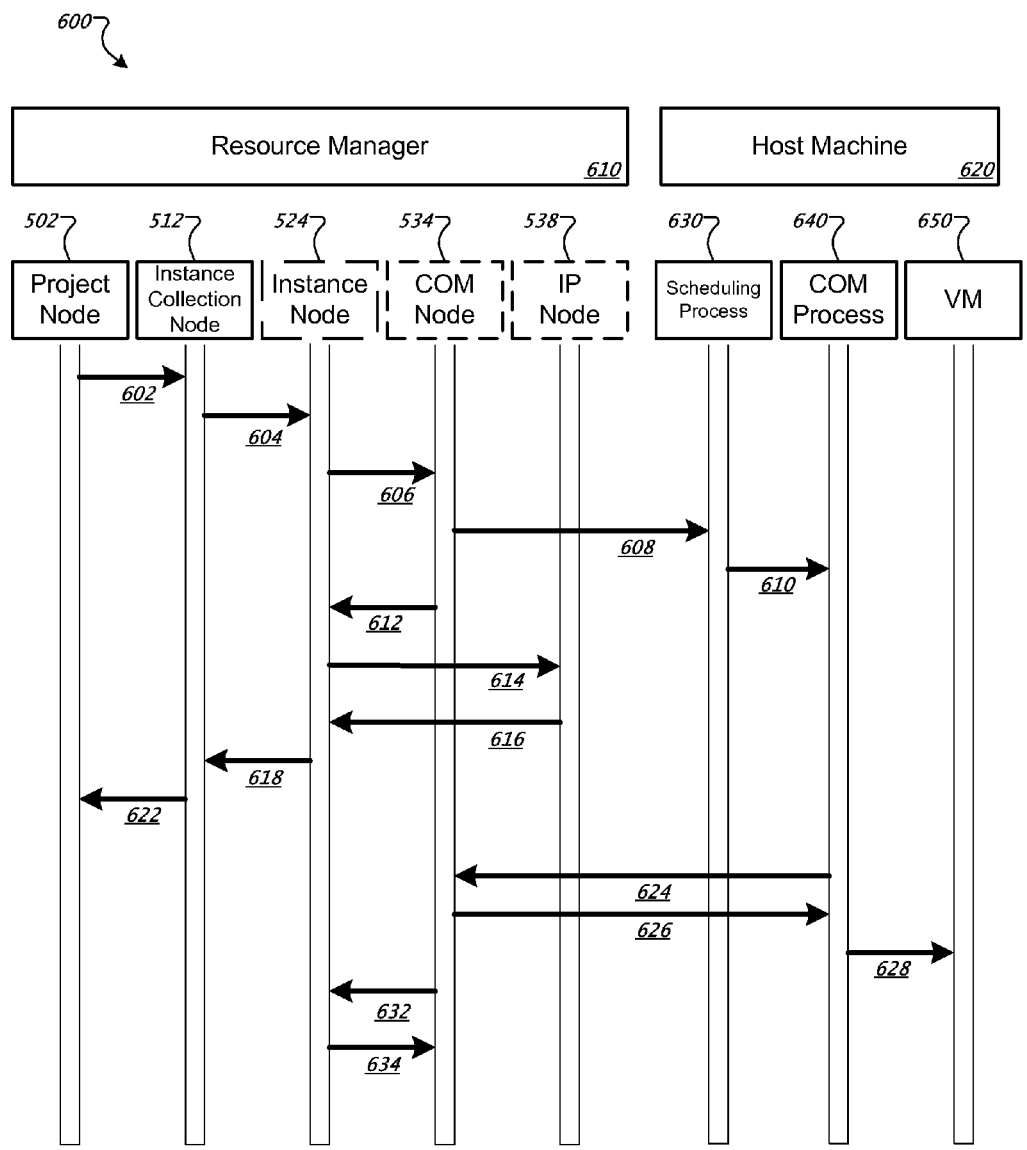
FIG. 6 is a sequence diagram of an example process for starting a new virtual machine.

FIG. 6 is a sequence diagram of an example process 600 for starting a new virtual machine. The example process 600 will be described as being performed to insert an instance 524 on the directed graph 500 as shown in FIG. 5. The example process 600 can be performed in response to a user action to start a new instance of a virtual machine or a logical virtual machine. Unlike operations in example process 400, the resource manager 610 need not identify a host machine for the new instance. Instead, a scheduling process running on the virtual machine system will identify a host machine for the new instance. Actions taken by nodes in the graph (e.g., nodes 502, 512, 524, 534, and 538) can be implemented by message handlers as described with respect to FIG. 2, and message routing can be implemented through the storage layer 216 and persistent storage 220 as described with respect to FIG. 2.

The resource manager 610 receives a request to allocate a new instance to a project corresponding to project node 502. The resource manager 610 triggers the message handler for project node 502 to handle the request.

Project node 502 sends a "Create instance" message 602 to instance collection node 512. The instance collection node 512 sends a "Create" message 604 to a new instance node 524.

The new instance node 524 sends a "Create" message 606 to a new COM node 534. The COM node 534 sends a message 608 to scheduling process 630 to schedule a new COM process on a host machine. The scheduling process 630 can identify a host machine for the COM process and associated virtual machine and can start the new COM process 610.

Upon successful scheduling of the COM process 640, the COM node 534 sends a "Success" message 612 back to the instance node 534.

The instance node 524 sends a "Create" message 614 to a new IP Address node 538. The new IP Address node 538 sends a "Success" message 616 back to the instance node 524. The instance node 524 sends a "Success" message 618 back to the instance collection node 512. The instance collection node 512 sends a "Success" message to the project node 502, and the project node can notify the user that a new instance has been added to the system.

The COM process 640 starts up and sends a message 624 to the COM node 534 indicating that it has started. In response, the COM node 534 sends a "Start VM" message 626 to the COM process to start a virtual machine. The COM process 640 issues a start command 628 to start virtual machine 650.

The COM node 534 sends a "VM Started" message 632 to the instance node 524. The instance node 524 sends an acknowledgement message 634 to the COM node 534.

Figure 7:
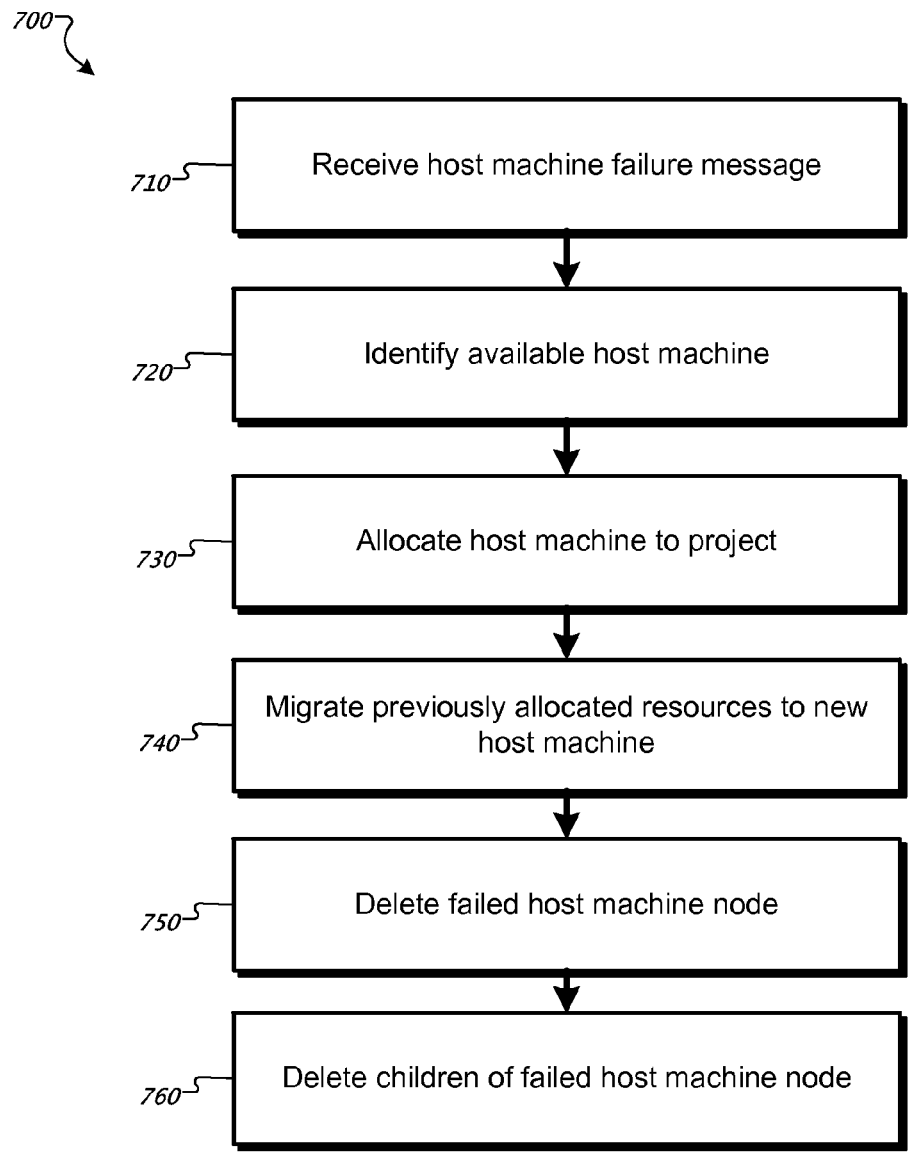
FIG. 7 is an example process performed by a resource manager in response to a resource failure.

FIG. 7 is an example process 700 performed by a resource manager (e.g., resource manager 210) in response to a resource failure. A resource manager can react to various kinds of system failures to restore the system to the state before the failure. For example, in the event of failed resources, the resource manager can migrate the failed resources to unallocated resources. The example process 700 will be described as steps taken in response to a failed host machine.

The resource manager receives a host machine failure message (710). Resource failures in the virtual machine system can send messages to be handled by the resource manager. The message can either be generated by a communication process running on a host machine, or can be generated by the resource manager if a host machine fails to respond after a predefined period of time. The host machine failure message can be received by any of the nodes in the graph, including, e.g., a COM node or a project node.

The resource manager identifies an available host machine (720). The resource manager can identify a host machine for either an ownership link or a usage link by a project node. In some implementations, identifying a host machine for an ownership link includes identifying a host machine that is unallocated to any owner. Identifying a host machine for a usage link can include identifying a host machine that is allocated to an owner, but is available for usage by the owner of the project node.

The resource manager allocates the identified host machine to the project (730). Allocating the identified host machine to a project can include generating a node in the graph for the host machine, as well as a link to the project node.

The resource manager migrates resources previously allocated to the failed host machine to the new host machine (740). The resource manager can allocate new resources to the new host machine by creating nodes in the graph corresponding to the new resources. For example, a new virtual machine can be allocated as described above with respect to FIG. 4. As previously discussed, allocating new resources can include propagating messages through the graph and making changes to the graph in a transactional way to ensure that changes to the graph are not partially completed. The allocation of resources can also include communicating with the communication process of the new host machine to start one or more new virtual machines that were previously running on the failed host machine.

After allocating resources to the new host machine, the resource manager deletes the node of the failed host machine (750). In some implementations, deleting a node causes the resource manager to delete all child nodes as part of the normal garbage collection policies.

The resource manager deletes children of the failed host machine node (760). In some implementations, deleting resource nodes cause the resource to be added back into a pool of available resources. For example, an IP address allocated to the failed host machine can be returned to a pool of available IP addresses. The returned IP address can then be assigned to the new host machine or any other host machine or virtual machine in the virtual machine system. In some implementations, failed resources (e.g., the failed host machine) are not returned to a pool of available resources until the failure is remedied.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method implemented by data processing apparatus, the method comprising:

maintaining a directed graph that represents allocations of resources in a distributed computing system, wherein each node of the graph represents an allocated resource, wherein different types of nodes in the graph represent different types of resources, wherein each particular type of node is associated with a message handler that is specific to the type of the node, and wherein each link between a pair of nodes in the graph represents ownership or usage of one resource represented by one node by another resource represented by the other node of the pair of nodes;

receiving a request to allocate a resource of a first type in the distributed computing system, the distributed computing system having a plurality of different types of resources including a plurality of hardware virtualizations implemented on different host machines;

in response to receiving the request, sending, by a message handler of a source node in the graph, a message to be processed by a message handler of the first type; and processing the message by the message handler of the first type, including allocating a first resource of the first type and associating a node of the first type with the first resource.

2. The method of claim 1, wherein sending the message comprises:

storing the message in a persistent storage system; and scheduling a message handler task to execute the message handler of the first type to process the message in the persistent storage system.

3. The method of claim 2 further comprising:

generating, by the message handler of the first type, the node of the first type; and generating a link between the source node in the graph and the node of the first type.

4. The method of claim 1, wherein the graph is an acyclic directed graph.

5. The method of claim 1, wherein each node in the graph has associated code that implements the message handler for the node.

6. The method of claim 1, wherein the source node represents a host machine, and wherein the node of the first type represents a virtual machine to be executed on the host machine.

7. The method of claim 1, further comprising:
receiving an indication of a failed resource represented by a failed resource node in the graph;
generating a new resource node representing a new resource, wherein the new resource node has a same type as the failed resource node; and
generating, for each of one or more child nodes descendant from the failed resource node, corresponding child nodes descendant from the new resource node.

8. The method of claim 7, further comprising:
deleting the failed resource node and the one or more child nodes descendant from the failed resource node.

9. The method of claim 8, wherein deleting a child node causes a resource represented by the child node to return to a pool of available resources in the distributed computing system.

10. A system comprising:
one or more data processing apparatus; and
a computer-readable storage device storing instructions that, when executed by the one or more data processing apparatus, cause the one or more data processing apparatus to perform operations comprising:
maintaining a directed graph that represents allocations of resources in a distributed computing system, wherein each node of the graph represents an allocated resource, wherein different types of nodes in the graph represent different types of resources, wherein each particular type of node is associated with a message handler that is specific to the type of the node, and wherein each link between a pair of nodes in the graph represents ownership or usage of one resource represented by one node by another resource represented by the other node of the pair of nodes;
receiving a request to allocate a resource of a first type in the distributed computing system, the distributed computing system having a plurality of different types of resources including a plurality of hardware virtualizations implemented on different host machines;
in response to receiving the request, sending, by a message handler of a source node in the graph, a message to be processed by a message handler of the first type; and
processing the message by the message handler of the first type, including allocating a first resource of the first type and associating a node of the first type with the first resource.

11. The system of claim 10, wherein sending the message comprises:
storing the message in a persistent storage system; and
scheduling a message handler task to execute the message handler of the first type to process the message in the persistent storage system.

12. The system of claim 11, wherein the operations further comprise:
generating, by the message handler of the first type, the node of the first type; and
generating a link between the source node in the graph and the node of the first type.

13. The system of claim 10, wherein the graph is an acyclic directed graph.

14. The system of claim 10, wherein each node in the graph has associated code that implements the message handler for the node.

15. The system of claim 10, wherein the source node represents a host machine, and wherein the node of the first type represents a virtual machine to be executed on the host machine.

16. The system of claim 10, the operations further comprising:
receiving an indication of a failed resource represented by a failed resource node in the graph;
generating a new resource node representing a new resource, wherein the new resource node has a same type as the failed resource node; and
generating, for each of one or more child nodes descendant from the failed resource node, corresponding child nodes descendant from the new resource node.

17. The system of claim 16, the operations further comprising:
deleting the failed resource node and the one or more child nodes descendant from the failed resource node.

18. The system of claim 17, wherein deleting a child node causes a resource represented by the child node to return to a pool of available resources in the distributed computing system.

19. A computer-readable storage device having stored thereon instructions, which, when executed by data processing apparatus, cause the data processing apparatus to perform operations comprising:
maintaining a directed graph that represents allocations of resources in a distributed computing system, wherein each node of the graph represents an allocated resource, wherein different types of nodes in the graph represent different types of resources, wherein each particular type of node is associated with a message handler that is specific to the type of the node, and wherein each link between a pair of nodes in the graph represents ownership or usage of one resource represented by one node by another resource represented by the other node of the pair of nodes;
receiving a request to allocate a resource of a first type in the distributed computing system, the distributed computing system having a plurality of different types of resources including a plurality of hardware virtualizations implemented on different host machines;
in response to receiving the request, sending, by a message handler of a source node in the graph, a message to be processed by a message handler of the first type; and
processing the message by the message handler of the first type, including allocating a first resource of the first type and associating a node of the first type with the first resource.

20. The storage device of claim 19, wherein sending the message comprises:
storing the message in a persistent storage system; and
scheduling a message handler task to execute the message handler of the first type to process the message in the persistent storage system.

21. The storage device of claim 20, wherein the operations further comprise:
generating, by the message handler of the first type, the node of the first type; and
generating a link between the source node in the graph and the node of the first type.

22. The storage device of claim 19, wherein the graph is an acyclic directed graph.

23. The storage device of claim 19, wherein each node in the graph has associated code that implements the message handler for the node.

24. The storage device of claim 19, wherein the source node represents a host machine, and wherein the node of the first type represents a virtual machine to be executed on the host machine.

25. The storage device of claim 19, the operations further comprising:
   receiving an indication of a failed resource represented by a failed resource node in the graph;
   generating a new resource node representing a new resource, wherein the new resource node has a same type as the failed resource node; and
   generating, for each of one or more child nodes descendant from the failed resource node, corresponding child nodes descendant from the new resource node.

26. The storage device of claim 25, the operations further comprising:
   deleting the failed resource node and the one or more child nodes descendant from the failed resource node.

27. The storage device of claim 26, wherein deleting a child node causes a resource represented by the child node to return to a pool of available resources in the distributed computing system.

* * * * *